(12) United States Patent
Fujii (10) Patent No.: US 9,280,165 B2
(45) Date of Patent: Mar. 8, 2016

(54) POWER SUPPLY CONTROL CIRCUIT USING N-TYPE AND P-TYPE FETS IN PARALLEL AND POWER SUPPLY CONTROL DEVICE

(75) Inventor: Shigeyuki Fujii, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 288 days.

(21) Appl. No.: 13/699,844

(22) PCT Filed: Jun. 16, 2011

(86) PCT No.: PCT/JP2011/063768
§ 371 (c)(1),
(2), (4) Date: Nov. 26, 2012

(87) PCT Pub. No.: WO2011/158894
PCT Pub. Date: Dec. 22, 2011

(65) Prior Publication Data
US 2013/0076324 A1    Mar. 28, 2013

(30) Foreign Application Priority Data
Jun. 16, 2010    (JP) ................. 2010-137467

(51) Int. Cl.
G05F 1/59    (2006.01)
B60R 16/03   (2006.01)
(Continued)

(52) U.S. Cl.
CPC . *G05F 1/59* (2013.01); *B60R 16/03* (2013.01); *G05F 1/569* (2013.01); *H02J 1/08* (2013.01); *H02J 7/0065* (2013.01)

(58) Field of Classification Search
CPC .... H02M 2001/0009; G05F 1/00; G05F 1/59; G05F 1/569
USPC .................. 323/222–225, 271–277, 282–285
See application file for complete search history.

(56) References Cited

U.S. PATENT DOCUMENTS 5,656,968 A * 8/1997 Sander et al. ................. 327/543
6,229,355 B1 * 5/2001 Ogasawara ................... 327/108
(Continued)

FOREIGN PATENT DOCUMENTS

CN    A-1746056    3/2006
JP    A-63-107222  5/1988
(Continued)

OTHER PUBLICATIONS

International Search Report issued in International Application No. PCT/JP2011/063768 dated Sep. 13, 2011.

*Primary Examiner* — Timothy J Dole
*Assistant Examiner* — Yusef Ahmed
(74) *Attorney, Agent, or Firm* — Oliff PLC (57) ABSTRACT

Provided are: a power supply control circuit having a configuration in which an N-channel FET and a P-channel FET can appropriately and selectively be used so as to control power feeding with high efficiency and at low cost; and a power supply control device including the power supply control circuit. An N-channel FET (NchFET in the drawings) and a P-channel FET (PchFET in the drawings) are connected in parallel with each other between the positive voltage side (+B) of a battery (direct current power supply) and a plurality of ECUs (loads) 4, 4, . . . , so as to appropriately control ON and OFF.

19 Claims, 9 Drawing Sheets

(51) Int. Cl.
*H02J 1/08* (2006.01)
*H02J 7/00* (2006.01)
*G05F 1/569* (2006.01)

(56) References Cited

U.S. PATENT DOCUMENTS

| | | | |
|---|---|---|---|
| 6,300,750 B1 * | 10/2001 | Oglesbee et al. | 323/282 |
| 6,347,028 B1 * | 2/2002 | Hausman et al. | 361/93.1 |
| 6,520,279 B2 * | 2/2003 | Fukumoto et al. | 180/446 |
| 7,839,097 B2 * | 11/2010 | Chen et al. | 315/291 |
| 8,169,202 B2 * | 5/2012 | Chen | 323/273 |
| 8,217,634 B2 * | 7/2012 | Lu et al. | 323/271 |
| 2001/0010458 A1 * | 8/2001 | Ohshima | 323/282 |
| 2001/0043204 A1 | 11/2001 | Ishida | |
| 2002/0043964 A1 * | 4/2002 | Saito et al. | 323/282 |
| 2002/0060587 A1 * | 5/2002 | Kimball et al. | 327/108 |
| 2003/0090251 A1 * | 5/2003 | Nakashimo | 323/280 |
| 2003/0098211 A1 * | 5/2003 | Saito et al. | 191/3 |
| 2005/0168072 A1 * | 8/2005 | Saito et al. | 307/10.1 |
| 2005/0179463 A1 * | 8/2005 | Kasuya et al. | 326/83 |
| 2006/0055348 A1 | 3/2006 | Kifuku | |
| 2007/0139021 A1 | 6/2007 | Kojima et al. | |
| 2007/0170978 A1 * | 7/2007 | Furuichi et al. | 327/530 |
| 2007/0206427 A1 * | 9/2007 | Hirobe | 365/189.09 |
| 2007/0229050 A1 * | 10/2007 | Shigeta et al. | 323/282 |
| 2007/0262748 A1 * | 11/2007 | Yamamoto | 320/125 |
| 2007/0268048 A1 * | 11/2007 | Komatsu et al. | 327/143 |
| 2009/0128106 A1 * | 5/2009 | Takahashi et al. | 323/277 |
| 2010/0238595 A1 * | 9/2010 | Ueda | 361/18 |
| 2011/0101878 A1 * | 5/2011 | Huber | 315/224 |

FOREIGN PATENT DOCUMENTS

| | | |
|---|---|---|
| JP | A-10-74394 | 3/1998 |
| JP | A-2001-154629 | 6/2001 |
| JP | A-2001-238348 | 8/2001 |
| JP | A-2007-172222 | 7/2007 |

* cited by examiner

POWER SUPPLY CONTROL CIRCUIT USING N-TYPE AND P-TYPE FETS IN PARALLEL AND POWER SUPPLY CONTROL DEVICE

This application is the national phase under 35 U.S.C. §371 of PCT International Application No. PCT/JP2011/063768 which has an International filing date of Jun. 16, 2011 and designated the United States of America.

BACKGROUND

The present invention relates to a power supply control device controlling power feeding to a load to be connected thereto using an FET, and to a power supply control circuit effectively using different types of FETs in accordance with an operation state of the load to appropriately adjust power consumption and realize power supply control with high efficiency, and relates to a power supply control device controlling the power feeding using the control circuit.

Recently, each device (load) may be configured to switch to a state with low power consumption such as a power-saving mode or a sleep mode and to operate therein, because energy saving is desired in various fields.

Particularly in the field of vehicles, the volume of devices mounted on a vehicle (load) tends to increase, while enhancement in fuel consumption is desired. Among such vehicle-mounted devices, some devices are desired to constantly supply power regardless whether the engine is stopped or running because of enhanced functions of a vehicle as a whole. Since, however, power consumption needs to be reduced for lower fuel consumption, power feeding to each vehicle-mounted device needs to be precisely controlled. For example, power feeding to a vehicle-mounted device which is not being used is stopped in order to reduce dark current. Thus, a configuration including a device for controlling power supply between a power supply and each vehicle-mounted device is realized.

An FET (Field Effect Transistor) is utilized as a switching element in power feeding control with respect to each device, particularly in high-side control for performing control on the positive polarity side of a power supply. In the high-side control, a mechanism for protecting each element is required in order to satisfy high reliability. Especially for the high-side control in the field of vehicles, power supply voltage may temporarily be unstable and may be used under high temperature. It is essential to protect devices because a failure in power supply to a vehicle-mounted device causes a danger. Moreover, in the field of vehicles, power supply voltage may temporarily be low at cranking due to a starter consuming a large amount of current. It is thus desired that control can be performed such that power feeding to each device will not be unstable at low voltage. Furthermore, in order to minimize voltage drop from power supply voltage, a device in which power supply control is realized is desired to have low on-resistance. In addition, power consumption is desired to be reduced also in power control when the entire vehicle-mounted system as a whole can be transferred to a low power consumption state (sleep state), such as when the vehicle is stopped.

Conventionally, there are some cases where a discrete FET is employed as the FET used in the high-side control. The configuration with the discrete FET, however, does not have a sufficient protective function. For example, a configuration has proposed in which a P-channel MOSFET (Metal Oxide Semiconductor FET) is further provided with an N-channel MOSFET as a protection element. Other than the protective function disclosed in the example, a device of IPS (Intelligent Power Switch) containing an FET and a protection element may be utilized. This enables the FET to be protected from overheat, overcurrent or overvoltage.

SUMMARY

It is noted that an IPS containing the protective function has a different feature depending on whether it uses an N-channel FET or a P-channel FET as an FET. In the N-channel IPS using the N-channel FET, lower on-resistance can be realized compared to the case with the P-channel IPS using the P-channel FET. The N-channel IPS is, however, difficult to operate at low voltage and with low power consumption because it needs to raise voltage of the gate with a charge pump. The P-channel IPS is, on the other hand, able to operate at low voltage and with low power consumption because a driving circuit is configured to be simple. It is, however, difficult to realize low on-resistance in the P-channel IPS due to the characteristic of the P-channel FET.

Thus, the N-channel IPS and P-channel IPS have advantages and disadvantages as a device used for high-side control. If the P-channel FET is used as disclosed in the example, giving priority to low power consumption, it is necessary to add a function of enhancing heat releasing efficiency in the P-channel FET for lowering the on-resistance. Such a configuration increases cost and thus is unrealistic.

It may also be possible that more than one N-channel FETs are used to act on each other in a supplemental manner. When a load consuming relatively large current is activated, a large-volume N-channel FET is appropriate. The configuration described above, however, allows a load to operate in the sleep mode so as to reduce power consumption. It is not necessary to activate a large-volume N-channel FET when the load is in the sleep mode. It is thus considered that an N-channel FET with a relatively small capacity may be used with a large-volume N-channel FET to supplement thereto. This, however, may possibly cause large current to flow in the small-volume N-channel FET and damage the FET.

An object of the example described below is to provide a power supply control circuit having a configuration in which an N-channel FET and a P-channel FET are connected in parallel with each other while one from the N-channel FET and the P-channel FET can appropriately be selected to allow control of power feeding with high efficiency and low cost, and to provide a power control device including the power control circuit.

According to the example embodiments, both the P-channel FET which can operate at low voltage and with low consumption current and the N-channel FET which can realize low on-resistance are connected in parallel with each other to either a positive voltage side or a negative voltage side of the direct current power supply, to allow power feeding to a load or loads in the cases where both of the FETs are turned on and where either one of them is turned on. This enables the characteristics of the P-channel FET and N-channel FET to appropriately be selected and utilized for control of power feeding.

Power feeding can simultaneously be controlled for the P-channel FET and the N-channel FET similarly from one end of the direct current power supply, e.g., the positive voltage side, to a load, without mutual interference. This makes it possible to select one or both of the FETs for operation in accordance with an amount of power required for the load.

For example, the use of IPS, in which an FET is connected to the protection circuit for protection from overheat, overvoltage and overcurrent, can realize a protective function required for the high-side control with a simple structure having no separate circuit for protection.

The N-channel FET to be turned on so as to protect FET from overloaded condition if the potential difference between the drain and the source of the N-channel FET or the P-channel FET is equal to or higher than the given voltage value which is used as a criterion for whether or not it is in the overload state. This enables protection from overvoltage or overcurrent which cannot be avoided by a built-in protection circuit alone contained in the IPS. It is noted that a discrete FET may also be used here instead of the IPS.

By maintaining the overload state using the latch circuit, it is possible not to output a signal for controlling the N-channel FET until the state changes. This can avoid unnecessary repetition of ON and OFF of the N-channel FET, such that the N-channel FET is turned on due to increase in the potential difference in response to the overload state, and the N-channel FET is turned off again when the potential difference is reduced due to turning on of the N-channel FET.

The use of a comparison judgment part such as a comparator with hysteresis, which makes a judgment on whether or not the value is lowered to the reference value lower than the given value, can avoid unnecessary repetition of ON and OFF of the N-channel FET.

The N-channel FET to be turned on if the temperature at and around the P-channel FET is higher than the given temperature which is a criterion for whether or not it is in the overload state, so that the FET can be protected from the overload condition. This enables protection from overheat which cannot be avoided with a built-in protection circuit alone contained in the IPS. It is noted that a discrete FET may also be used instead of the IPS.

By maintaining the overload state using the latch circuit, it is possible not to output a signal for controlling the N-channel FET until the state changes. This can avoid unnecessary repetition of ON and OFF of the N-channel FET, such that the N-channel FET is turned on due to increase in the potential difference in response to the overload state, and the N-channel FET is turned off again when the potential difference is reduced due to turning on of the N-channel FET.

The use of a comparison judgment part such as a comparator with hysteresis, which makes a judgment on whether or not the value is lowered to the reference value lower than the given value, can avoid unnecessary repetition of ON and OFF of the N-channel FET.

The N-channel FET to be turned on at a low voltage lowered from the positive voltage of the power supply.

A switch using the P-channel FET which can operate at low voltage and with low consumption current as well as a switch using the N-channel FET which can realize a low on-resistance are utilized to allow appropriate control of the power feeding by determining which one of the FETs to be turned on in accordance with the operation state of a load or the outside condition.

It can be realized that the low on-resistance by simultaneously using the P-channel FET and the N-channel FET in parallel with each other in the active state of the load which requires comparatively large current. If, on the other hand, the load is switched to the sleep state, the N-channel FET which requires a charge pump is turned off to lower the power consumption and only the P-channel FET is used, thereby allowing the entire system with the power supply control device to operate at low voltage and with low consumption current.

Effect of the Invention

According to the example embodiments, the P-channel FET and N-channel FET that have advantages and disadvantages are used in parallel to control ON and OFF depending on circumstances, so that highly efficient power control is possible that can realize both low power consumption and low on-resistance by making use of the respective characteristics.

Especially when the power supply control circuit or the power supply control device according to the example embodiments is used in a vehicle, both the P-channel FET and the N-channel FET may be turned on to perform power control while the vehicle is running, and only the P-channel FET may be used when the vehicle can be switched to the sleep state which requires low power consumption, such as when the vehicle is halted and idling is stopped, to reduce power to be consumed by the power control itself. Accordingly, FET can selectively be turned ON and OFF depending on the circumstances of a vehicle, so that highly efficient control is possible. Moreover, appropriate control depending on a state may be possible, such as the case where the P-channel FET is turned on in a low voltage state caused by cranking or where the N-channel FET is additionally turned on in an overload state caused by short-circuit of a load.

DESCRIPTION OF EXAMPLE EMBODIMENTS

In the embodiments below, an example is described in which the power supply control circuit is applied to a power supply control system for controlling power feeding of a plurality of ECUs (Electronic Controller Units) mounted on a vehicle.

Embodiment 1

Figure 1:
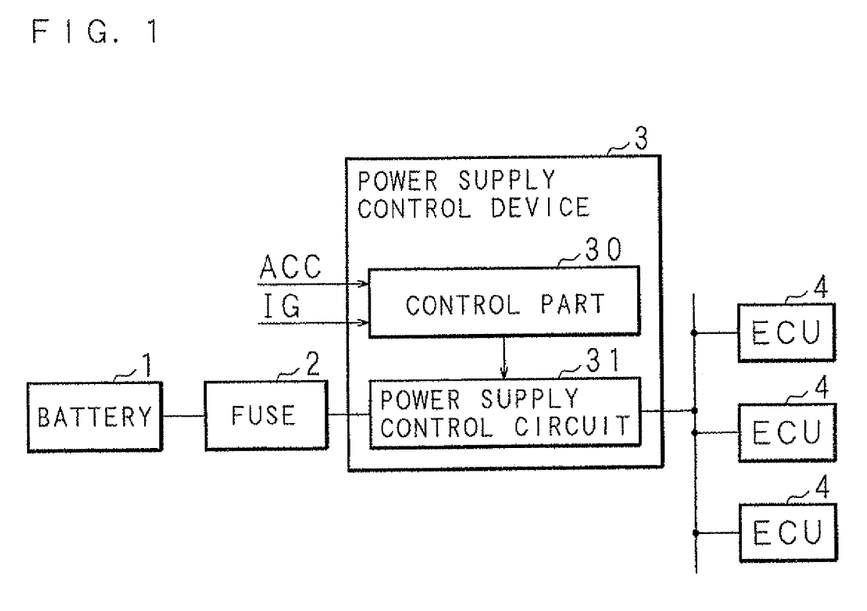
FIG. 1 is a block diagram illustrating a configuration of a power control system according to Embodiment 1.

FIG. 1 is a block diagram illustrating a configuration of a power supply control system according to Embodiment 1. The power supply control system includes a battery 1, a fuse (fuse box) 2 connected to the battery 1, and a power supply control device 3 for controlling power feeding from the battery 1 to ECUs 4, 4, . . . which are to be power controlled. The positive voltage side (+B) of the battery 1 is connected to the power supply control device 3 through the fuse 2, while the plurality of ECUs 4, 4, ... are connected in bus connection to an electric line which is further connected to the power supply control device 3.

The power supply control device 3 includes a control part 30 using a microcomputer and a power supply control circuit 31 using an FET. The control part 30 is so connected as to sense ON and OFF of an accessory switch and an ignition switch (not shown), and outputs a control signal for controlling ON/OFF of the FET to the power supply control circuit 31 based on the of/off of these switches.

The control part 30 uses a microcomputer to read out a control program stored in a built-in ROM and execute it to control the power supply control circuit 31 in accordance with the states of the accessory switch and the ignition switch. The control part 30 is not limited to have the configuration using the microcomputer, but may also have a configuration solely using a CPU or an MPU.

Figure 2:
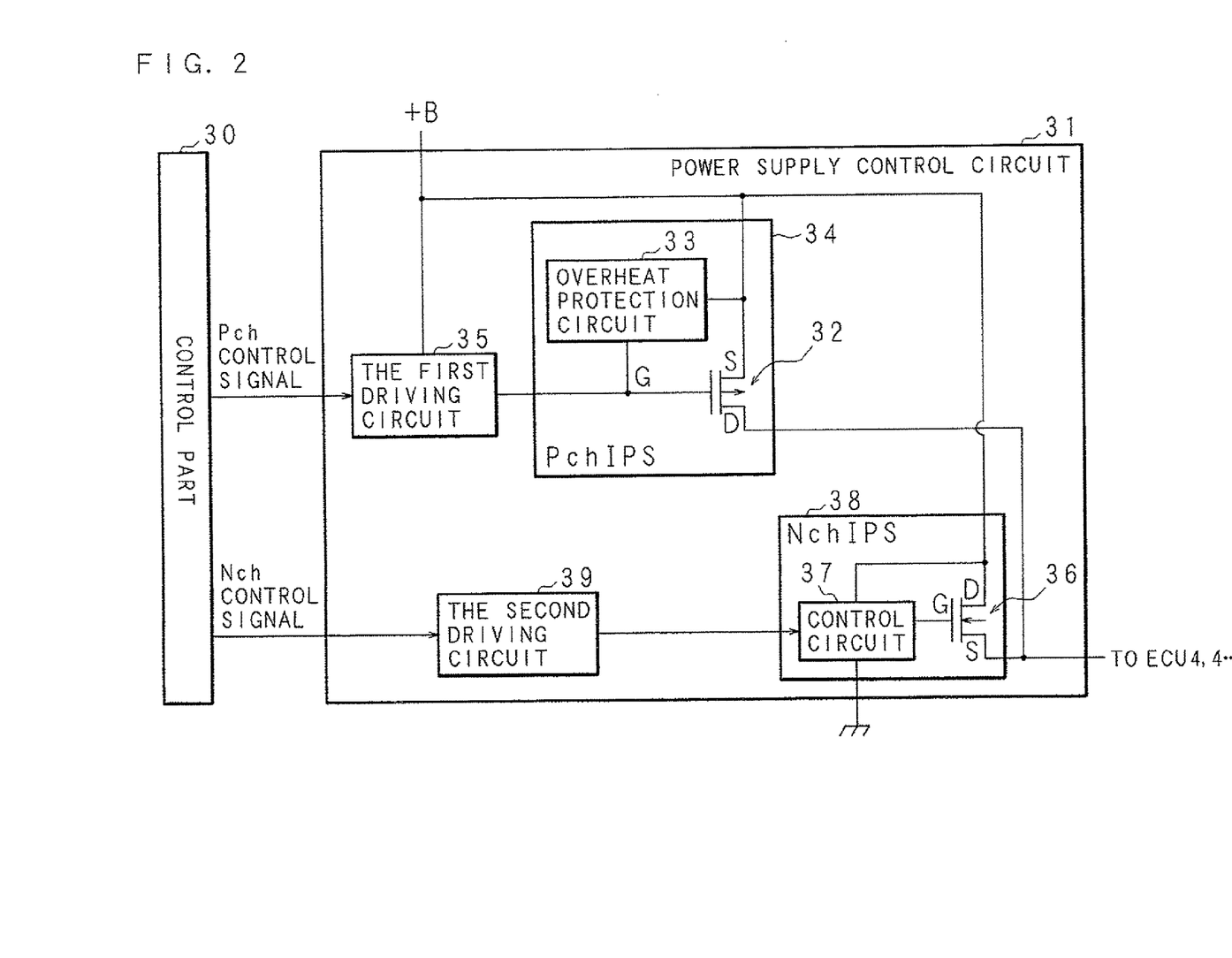
FIG. 2 is a circuit diagram illustrating an internal configuration of a power control circuit included in a power control device according to Embodiment 1.

FIG. 2 is a circuit diagram illustrating the internal configuration of the power supply control circuit 31 included in the power supply control device 3 according to Embodiment 1. The power supply control circuit 31 includes a P-channel IPS 34 using a P-channel FET 32 and containing a overheat protection circuit 33, the first driving circuit 35 for driving the P-channel IPS 34 based on a control signal from the control part 30, an N-channel IPS 38 using an N-channel FET 36 and containing a control circuit 37 including a protective function, and the second driving circuit 39 for driving the N-channel IPS 38 based on a control signal from the control part 30. Note that the "P channel" is represented as "Pch" while the "N channel" is represented as "Nch" in FIG. 2.

The source (S) of the P-channel FET 32 is connected to the positive voltage side (+B) of the battery 1, while the drain (D) thereof is connected to the side of the ECUs 4, 4, ... (load). The output from the first driving circuit 35 is to be input to the gate (G) of the P-channel FET 32.

The first driving circuit 35 is connected to the positive voltage side of the battery 1, and controls the gate voltage based on a P-channel (Pch) control signal input from the control part 30. The overheat protection circuit 33 is connected between the source and gate of the P-channel FET 32, and is made to forcibly turn off the P-channel FET 32 by a gate input upon sensing overheat.

The drain (D) of the N-channel FET 36 is connected the positive voltage side (+B) of the battery 1, while the source (S) thereof is connected to the side of the ECUs 4, 4, ... (load). The output from the second driving circuit 39 is to be input to the gate (G) of the N-channel FET 36 through the control circuit 37 contained in the N-channel IPS 38.

One end of the control circuit 37 is connected to the N-channel FET 36, while the other end thereof is connected (grounded) to the body earth of the vehicle. The control circuit 37 includes a booster circuit for a charge pump of the gate. The second driving circuit 39 inputs an N-channel (Nch) control signal from the control part 30, and outputs a control signal to the control circuit 37 based on the N-channel control signal. When a signal for instructing to turn on is input from the control part 30 through the second drive circuit, the control circuit 37 raises the gate voltage to turn on the N-channel FET 36. The control circuit 37 further includes a circuit for exerting the protective function for protection from overheat and overcurrent.

The P-channel IPS 34 (P-channel FET 32) and the N-channel IPS 38 (N-channel IPS 36) in the power supply control circuit 31 configured as described above are controlled for their "on" and "off" by the control part 30. The control part 30 performs control to turn on either one or both of the IPSs depending on the state of the vehicle or the vehicle-mounted ECUs 4, 4, .... Since the P-channel IPS 34 and the N-channel IPS 38 in the power supply control circuit 31 internally have protection circuits, respectively, the state may vary due to not only the control by the control part 30 but also operation of these protection circuits, possibly causing the ON/OFF state of the P-channel IPS 34 and N-channel IPS 38 to switch from one another.

Figure 3:
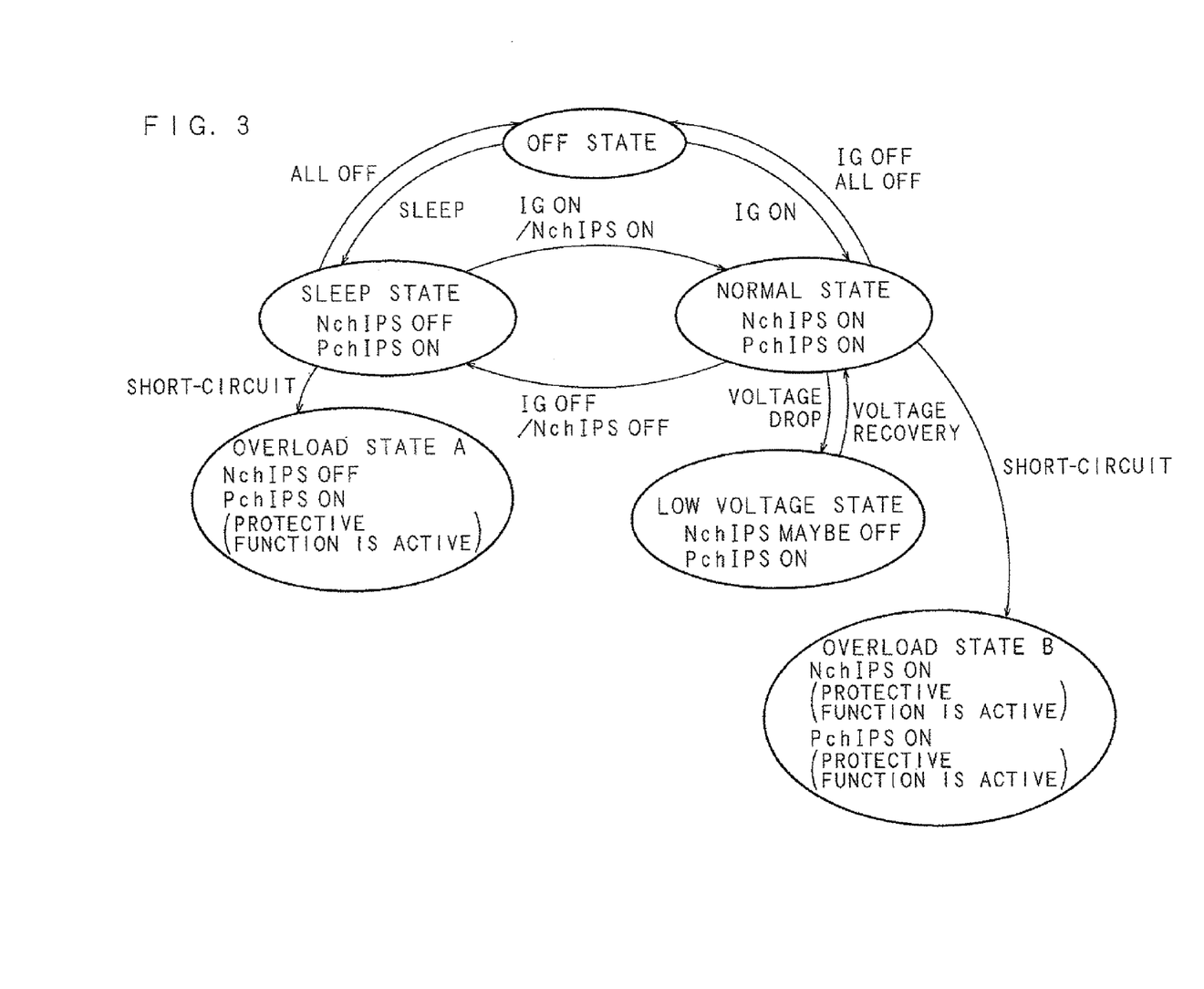
FIG. 3 is a state transition view illustrating an example of transition in states of control performed by the power control device according to Embodiment 1.

FIG. 3 is a state transition view illustrating an example of transition in states of control performed by the power supply control device 3 according to Embodiment 1. Initially, the power supply control system is in the OFF state (OFF) where all power feeding from battery 1 to the ECU 4, 4, ... and the power supply control circuit 31 is cut off. When the ignition switch is turned on (IG ON), the control part 30 senses it. The control part 30 determines that power feeding is necessary so as to transfer the state to the normal state where the ECU 4, 4, ... operate. Here, the control part 30 outputs a P-channel control signal and an N-channel control signal for turning on (ON) both the P-channel IPS 34 and the N-channel IPS 38 to the first driving circuit 35 and the second driving circuit 39, respectively.

This turns on both the P-channel IPS 34 and the N-channel IPS 38, and power feeding to the ECUs 4, 4, ... is started. While the ECUs 4, 4, ... are operating, the number and configuration of the ECUs 4, 4, ... (load) are designed such that current of approximately six to nine amperes flows if, for example, the standard for the fuse 2 is assumed as fifteen amperes. Here, assuming that current of six to nine amperes flows in the P-channel FET 32 and the N-channel FET 36 during a short period of time, devices used as the P-channel FET 32 and the N-channel FET 36 may be selected and designed as appropriate.

If the ignition switch is turned off (IG OFF) in the normal state where all of the ECUs 4, 4, ... are operating, or if both the ignition switch and accessory switch are turned off, the control part 30 senses it. Here, the control part 30 outputs an N-channel control signal to the second driving circuit 39 so as to turn off (OFF) the N-channel IPS 38 in accordance with the ECUs 4, 4, ... being switched to the sleep state.

Accordingly, the P-channel IPS 34 is turned on (ON) while the N-channel IPS 38 is turned off (OFF) when the ECUs 4, 4, ... are switched to the sleep state, thereby suppressing the power feeding to the ECUs 4, 4, ... at a certain degree. When the ECUs 4, 4, ... are switched to the sleep state, the power feeding will be, for example, approximately several tens of milliamperes.

Assume that the driving current of the N-channel IPS 38 is two to three milliamperes and the driving current of the P-channel IPS 34 is one hundred microamperes. Here, if the N-channel IPS 38 is turned on in the sleep state where the necessary amount of current supplied to the ECUs 4, 4, ... is only fifty milliamperes, the amount of current consumption of two to three milliamperes for the N-channel IPS 38 accounts for five to ten percent of the entire current consumption. This is insufficient for the power saving effect. The power consumption can effectively be reduced if only the P-channel IPS 34 with smaller driving current is turned on in the sleep state.

Moreover, at the moment when the ignition switch is turned on, i.e. at cranking, the output voltage (e.g., 12V) of the battery 1 may temporarily be at low voltage (5-6V) (low voltage state) because the starter consumes a large amount of current. Here, the N-channel IPS 38 may be turned off (OFF) due to insufficient charge pumping at the control circuit 37, causing only the P-channel IPS 34 to be turned on.

It is desirable here to design the P-channel IPS 38 to be able to control power feeding to the ECUs 4, 4, ... in the normal state, i.e. to be endurable for approximately six to nine amperes, while only the P-channel IPS 34 is in the ON state.

As the output voltage of the battery 1 is recovered from the low voltage, the N-channel IPS 38 is turned on and is switched from the low voltage state to the normal state.

If short-circuit occurs in any one of the ECUs 4, 4, ... while the ECUs 4, 4, ... are in the sleep state, the protective function is activated at the P-channel IPS 34 which is in the ON state (overload state A). This can prevent overcurrent from damaging the P-channel FET 32.

Moreover, if short-circuit occurs at any one of the ECUs 4, 4, ... when all of the ECUs 4, 4, ... are in the normal state where they operate, the protective function is activated at both P-channel IPS 34 and N-channel IPS 38 (overload state B). This can prevent overcurrent from damaging the P-channel FET 32 and the N-channel FET 36.

It is noted that the control part 30 may preferably be configured to, when transition is made to the overload states A, B where the protective function is being activated, make the first driving circuit 35 or the second driving circuit 39 feedback the transition to sense it, to generate warning sound to a driver through a speaker, and to notify the driver of the warning for occurrence of short-circuiting with a light.

Furthermore, the control part 30 senses it if the ignition switch is turned on (IG ON) or the accessory switch is turned on when the vehicle is halted and the ECUs 4, 4, ... are in the sleep state. The control part 30 outputs an N-channel control signal to the second driving circuit 39 so as to turn on (ON) the N-channel IPS 38 in response to the fact that the ECUs 4, 4, ... wake up to go back to the normal state and start consuming the current of six to nine amperes.

The control part 30 further determines whether or not the remaining amount of the battery 1 is lower than a given threshold based on the output of a sensor for monitoring the remaining amount of the battery 1, when the vehicle is halted and the ECUs 4, 4, ... are in the sleep state. If it is determined that the remaining amount is lower that the threshold, transition is made to the OFF state where all power feeding to the ECUs 4, 4, ... is cut off (OFF state). Thus, the control part 30 outputs a P-channel control signal and an N-channel control signal for turning off both the P-channel IPS 34 and the N-channel IPS 38 to the first driving circuit 35 and the second driving circuit 39.

As illustrated in Embodiment 1, with the power supply control circuit 31 in which the P-channel FET 32 and the N-channel FET 36 are connected in parallel with each other, an FET appropriate for the state of the ECUs 4, 4, ... may selectively be activated to utilize the characteristic of low power consumption for the P-channel FET 32 and that of low on-resistance for the N-channel FET 36 in the activated state, making it possible to perform power control with high performance.

Embodiment 2

In Embodiment 2, a separate protection circuit is provided in addition to a protective function of the N-channel IPS and P-channel IPS.

The hardware configuration in Embodiment 2 is substantially the same as that in Embodiment 1 except for the internal configuration of the power supply control device and details of processing. In the description below, therefore, a common structure is denoted by the same reference number and will not be described in detail.

Figure 4:
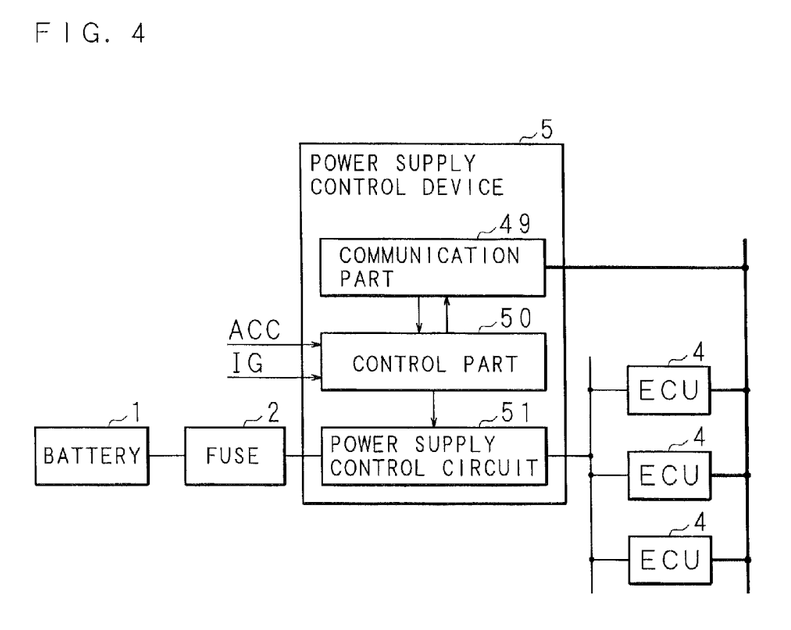
FIG. 4 is a block diagram illustrating a configuration of a power supply control system according to Embodiment 2.

FIG. 4 is a block diagram illustrating a configuration of a power supply control system according to Embodiment 2. The power supply control system according to Embodiment 2 includes a battery 1, a fuse 2, and a power supply control device 5 for controlling power feeding from the battery 1 to ECUs 4, 4, ... The positive voltage side (+B) of the battery 1 is connected to the power supply control device 5 through the fuse 2, while the ECUs 4, 4, ... are connected in bus connection to a power line which is further connected to the power supply control device 5.

The power supply control device 5 includes a control part 50 using a microcomputer, a power supply control circuit 51 using an FET, and a communication part 49 connected to the ECUs 4, 4, ... or another communication device. The control part 50 is so connected as to sense ON/OFF of an accessory switch and an ignition switch (not shown), and outputs a control signal for controlling ON/OFF of the FET to the power supply control circuit 51 based on the ON/OFF of those switches or information obtained by communication through the communication part 49.

The control part 50 uses a microcomputer to read out and execute a control program stored in an internal ROM, to control the power supply control circuit 51 in accordance with the state of an accessory switch and ignition switch or the information obtained through the communication part 49. The control part 50 may also have a configuration solely using a CPU or an MPU, not limited to the configuration using the microcomputer.

The communication part 49 has a network controller function and realizes communication with the ECUs 4, 4, ... or another communication device based on, for example, CAN (Controller Area Network). The communication part 49 detects reception of information transmitted from the ECUs 4, 4, ... or another communication device and notifies the control part 50 thereof.

Figure 5:
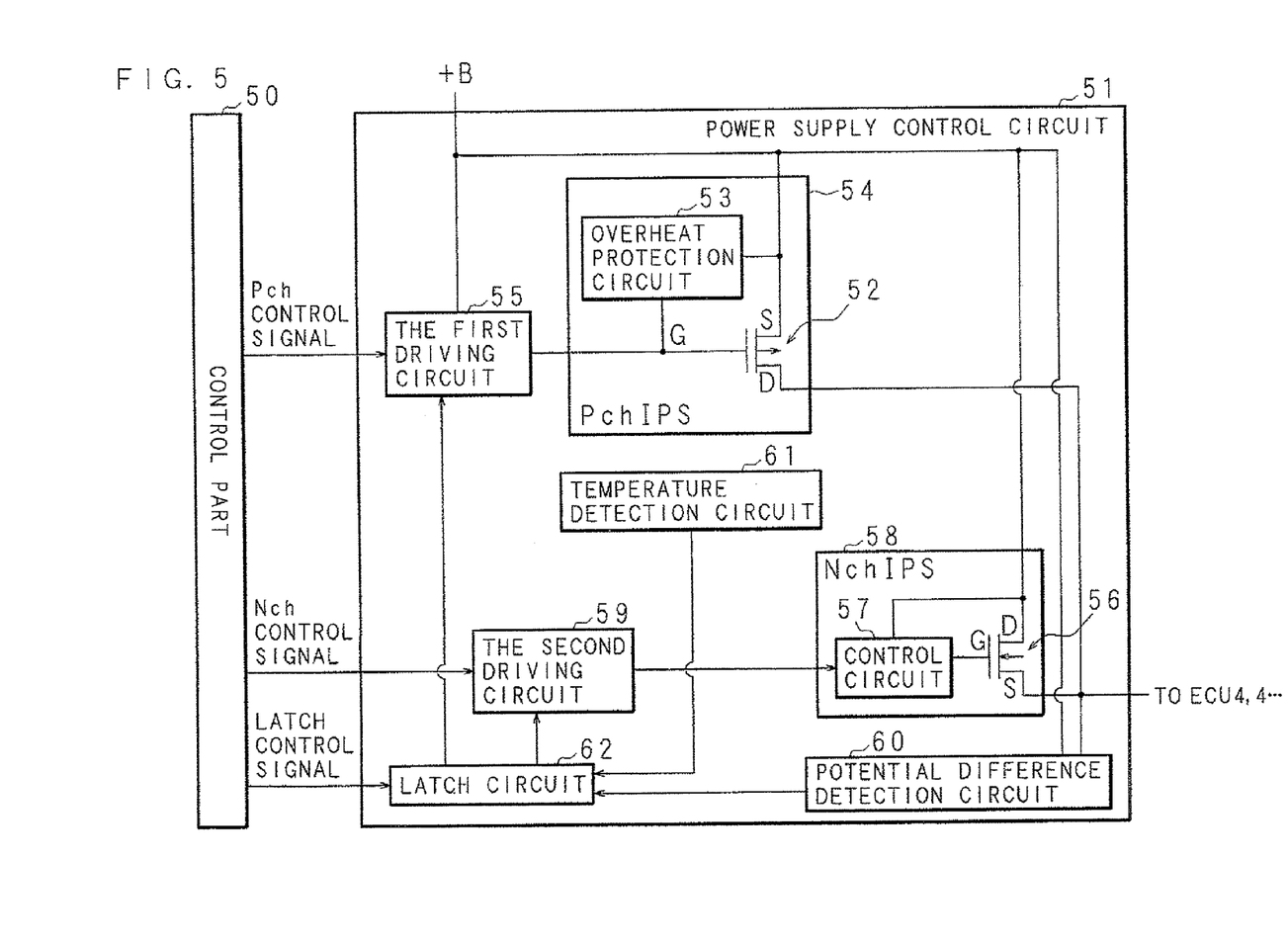
FIG. 5 is a circuit diagram illustrating an internal configuration of a power supply control circuit included in a power supply control device according to Embodiment 2.

FIG. 5 is a circuit diagram illustrating an internal configuration of the power supply control circuit 51 included in the power supply control device 5 according to Embodiment 2. The power supply control circuit 51 includes a P-channel IPS 54 containing an overheat protection circuit 53, the first driving circuit 55 activating the P-channel IPS 54 based on a control signal from the control part 50, an N-channel IPS 58 using an N-channel FET 56 and containing a control circuit 57 having a protective function, the second driving circuit 59 driving the N-channel IPS 58 based on a control signal from the control part 50, a potential difference detection circuit 60 detecting a potential difference Vas between the source and the drain of the P-channel FET 52 or the N-channel FET 56, a temperature detection circuit 61 detecting temperature of the P-channel FET 52 and the periphery thereof, and a latch circuit 62 holding outputs from the potential difference detection circuit 60 and the temperature detection circuit 61. Note that, also in FIG. 5, the "P-channel" and "N-channel" are represented as "Pch" and "Nch," respectively, as in FIG. 2.

The source (S) of the P-channel FET 52 is connected to the positive voltage side (+B) of the battery 1, while the drain (D) thereof is connected to the side of the ECUs 4, 4, ... (load). The gate (G) of the P-channel FET 52 is configured to receive an output from the first driving circuit 54.

The first driving circuit 55 is connected to the positive voltage side of the battery 1, and receives a P-channel (Pch) control signal input from the control part 50 to control the gate voltage based on the P-channel control signal. The first driving circuit 55 is configured to also receive an output of the latch circuit 62 to control the gate voltage based on the P-channel control signal and the output of the latch circuit 62. The overheat protection circuit 53 is connected between the source and the gate of the P-channel FET 52, so as to forcibly turn off the P-channel FET 52 with a gate input upon sensing overheat.

The drain (D) of the N-channel FET 56 is connected to the positive voltage side (+B) of the battery 1, while the source (S) thereof is connected to the side of the ECUs 4, 4, . . . (load). The N-channel FET 56 is configured such that an output of the second driving circuit 59 is input to the gate (G) thereof through the control circuit 57 contained in the N-channel IPS 58.

One end of the control circuit 57 is connected to the N-channel FET 56, while the other end thereof is connected (grounded) to the body earth of the vehicle, and includes a booster circuit for charge-pumping the gate. The second driving circuit 59 is configured to receive an N-channel (Nch) control signal from the control part 50 and also to receive an output from the latch circuit 62. The control part 50 outputs a control signal to the control circuit 57 based on the N-channel control signal and the output of the latch circuit 62. The control circuit 57 raises the gate voltage and turns on the N-channel FET 56 upon receiving a signal for instructing it to turn on the signal from the control part 50 through the second driving circuit 59. The control circuit 57 includes a circuit for exerting a function of protection from overheat and overcurrent.

The second driving circuit 59 receives an N-channel (Nch) control signal from the control part 50 to control the gate voltage based on the N-channel control signal. Note that the second driving circuit 59 is configured to also receive the output of the latch circuit 62 and controls the gate voltage of the N-channel FET 56 based on the N-channel control signal and the output of the latch circuit 62.

The potential difference detection circuit 60 detects voltage using a device such as a differential amplifier or a transistor. The potential difference detection circuit 60 reads an output from the device as a voltage value through A/D conversion, and compares the voltage value with a threshold stored in a built-in ROM (not shown) or makes a comparison judgment using a comparator on whether or not the detected potential difference is equal to or larger than a given voltage value. The potential difference detection circuit 60 outputs a signal so as to activate the N-channel IPS 58 if it is determined that the potential difference is equal to or larger than the given voltage value.

The temperature detection circuit 61 measures the temperature at and around the P-channel IPS 54 using a temperature detection device such as a thermistor, and converts the temperature into the voltage value. The temperature detection circuit 61 reads the voltage value as data through A/D conversion, and compares the voltage value with a threshold stored in the built-in ROM or makes a comparison judgment using a comparator on whether or not the detected temperature is equal to or larger than a given temperature. If it is determined that the detected temperature is equal to or larger than the given temperature, the temperature detection circuit 61 outputs a signal so as to activate the N-channel IPS 58 because the P-channel FET 52 is overloaded.

The latch circuit 62 receives the outputs of the potential difference detection circuit 60 and the temperature detection circuit 61, and outputs them to the first driving circuit 55 and the second driving circuit 59, respectively. Here, the outputs may be received only by at least the second driving circuit 59. The latch circuit 62 receives a latch control signal from the control part 50. At the latch circuit 62, a signal input is held based on the latch control signal. The use of the latch circuit 62 prevents a signal for turning on/off the N-channel IPS 58 from being output to the second driving circuit 59 until it is determined that the state is changed. This turns on the N-channel IPS 58 and lowers the potential difference or temperature, which goes back and forth around the given voltage value or the given temperature, so that unnecessary repetition of ON/OFF of the N-channel IPS 58 can be avoided.

When determined at the potential difference detection circuit 60 or the temperature detection circuit 61 if the voltage or temperature is equal to or larger than the given voltage or given temperature using a comparator, the comparator may have hysteresis. Here, having hysteresis means that the comparison judgment may be made based on not only the given voltage or the given temperature but also different reference values corresponding to the given value. In other words, the potential difference detection circuit 60 determines that the detected potential difference is less than the given voltage for the first time when it is even lower than a reference value which is lower than the given voltage, while the temperature detection circuit 61 determines that the detected temperature is less than the given temperature for the first time when it is even lower than a reference value lower than the given temperature. There may be a case where the latch circuit 62 is unnecessary. This can prevent the N-channel IPS 58 from unnecessarily repeating ON and OFF.

Figure 6:
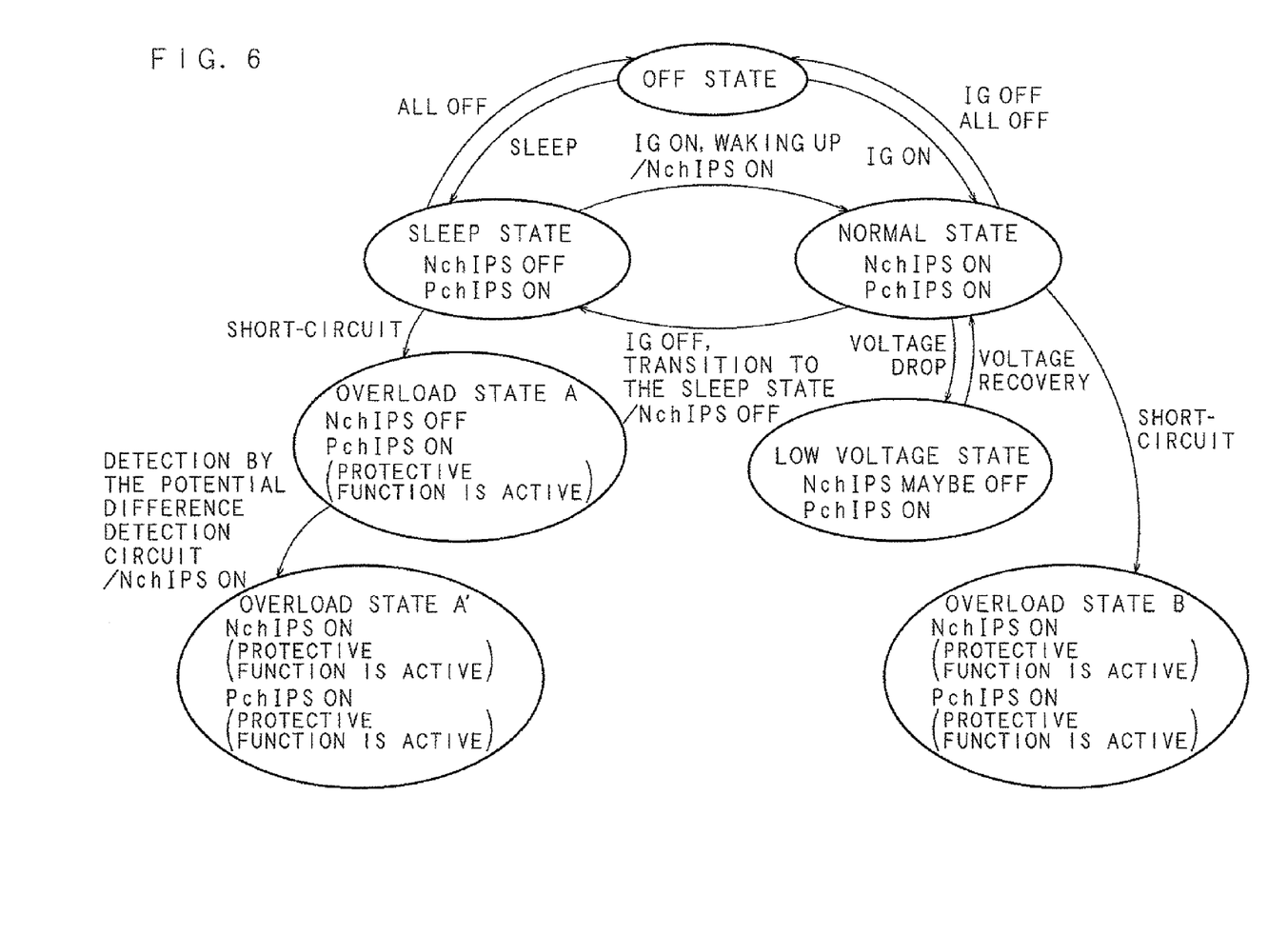
FIG. 6 is a state transition view illustrating an example of transition in states of control performed by the power supply control device according to Embodiment 2.

FIG. 6 is a state transition view illustrating an example of transition in states of control performed by the power supply control device 5 according to Embodiment 2. Since the transition among an OFF state, a normal state, a sleep state as well as overload states A and B is similar to the state transition in Embodiment 1 illustrated is FIG. 3, description thereof will not be repeated here.

In Embodiment 2, the power supply control device 5 includes the communication part 49 which allows it to respond to a change in the state based on not only ON/OFF of the ignition switch but also wake-up communication or a notice of transition to the sleep state received from the ECU 4, 4, . . . or another communication device.

If the ignition switch is turned off (IG OFF), or if both the ignition switch and the accessory switch are turned off, or if a notice is issued through the communication part 49 that all the connected ECUs 4, 4, . . . make transition to the sleep state in the case where the ECUs 4, 4, . . . are all in the normal state, the control part 50 senses it. Here, the control part 50 outputs an N-channel control signal to the second driving circuit 59 so as to turn off (OFF) the N-channel IPS 58 in response to the fact that the ECUs 4, 4, . . . make transition to the sleep state.

If the vehicle is halted and the ECUs 4, 4, . . . are in the sleep state, transition may be made to the normal state in addition to the ignition switch being turned on. One of the ECUs 4, 4, . . . wakes up and executes wake-up communication so as to notify the other ECUs 4, 4, . . . of the waking up. Here, within e.g. one second from the start of the wake-up communication, the control part 50 senses this through the communication part 49. If the control part 50 senses the transition of the ECUs 4, 4, . . . to the normal state through the communication part 49, it outputs an N-channel control signal to the second driving circuit 59 so as to turn on (ON) the N-channel IPS 58.

It is noted that, in the case where the ECUs 4, 4, . . . start operating preceding to the power supply control device 5, the ECUs 4, 4, . . . may operate under the condition where only the P-channel IPS 54 is on, before the control part 50 outputs the N-channel control signal so as to turn on the N-channel IPS 59. Here, the capacity of the P-channel IPS 54 may be so designed as to be bearable to six to nine amperes which may be applied in. a short period of time, in order to avoid malfunction due to an overloaded situation during the transition in states.

Furthermore, as the potential difference detection circuit 60 and the temperature detection circuit 61 are used for control in Embodiment 2, more meticulous control as described below can be performed.

When transition is made to the overload state A where the protective function is activated in the power supply control circuit 51, the potential difference $V_{ds}$ between the source and drain of the P-channel FET 52 or the N-channel VET 56 is increased. This allows the control part 50 to sense the overload state A and to output an N-channel control signal to the second driving circuit 59 so as to turn on (ON) the N-channel IPS 58. Thus, the state of the power supply control circuit 51 is switched from the overload state A to the overload state A'. This can more effectively protect the P-channel FET 52.

Accordingly, the parallel connection of the P-channel FET 52 and the N-channel FET 56 at the power supply control circuit 51 enables an FET appropriately controlled for the state of the ECUs 4, 4, . . . to selectively operate, and thus power supply control can be performed with high efficiency by making use of the characteristics of low current consumption for the P-channel FET 52 in the sleep state and low on-resistance for the N-channel FET 56 in the active state. Moreover, control also using the potential difference detection circuit 60 and the temperature detection circuit 61 can further realize power supply control with high efficiency.

Embodiment 3

Figure 7:
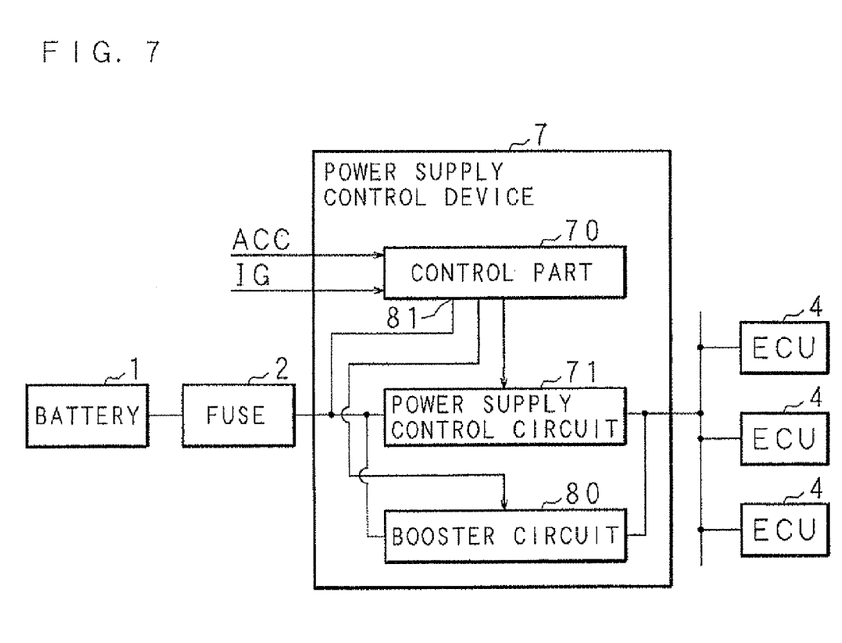
FIG. 7 is a block diagram illustrating a configuration of a power supply control system according to Embodiment 3.

FIG. 7 is a block diagram illustrating a configuration of a power supply control system according to Embodiment 3 for the power supply control circuit and the power supply control device according to the present invention. The power supply control system is for a vehicle, and includes a battery 1, a fuse (fuse box) 2 connected to the battery 1, and a power supply control device 7 for controlling power feeding from the battery 1 to the ECUs 4, 4, . . . that are to be power-controlled. The positive voltage side (+B) of the battery 1 is connected to the power supply control device 7 through the fuse 2, while a plurality of ECUs 4, 4, . . . are connected in bus connection to the power line further connected to the power supply control device 7.

The power supply control device 7 includes a control part 70 using a microcomputer, a power supply control circuit 71 using an FET, a booster circuit 71 connected in parallel to the power supply control circuit 71, and forms a DC/DC converter.

The control part 70 is connected to an accessory switch and an ignition switch (not shown) so as to sense ON/OFF thereof, while containing a voltage detector 81 for detecting a voltage value input to the power supply control device 7. The control part 70 outputs a control signal for controlling ON/OFF of FET to the power supply control circuit 71 based on ON/OFF of the switches and a detection result of the voltage detector 81. The control part 70 further outputs a control signal for controlling ON/OFF of the booster circuit 80 based on ON/OFF of the switches and a detection result of the voltage detector 81.

The control part 70 uses a microcomputer to read out and execute a control program stored in a built-in ROM, to control the power supply control circuit 71 and the booster circuit 80 in accordance with the states of the accessory switch and the ignition switch as well as the detection result of the voltage detector 81. The control part 70 is not limited to the configuration using a microcomputer but may be a configuration solely using CPU or MPU.

Figure 8:
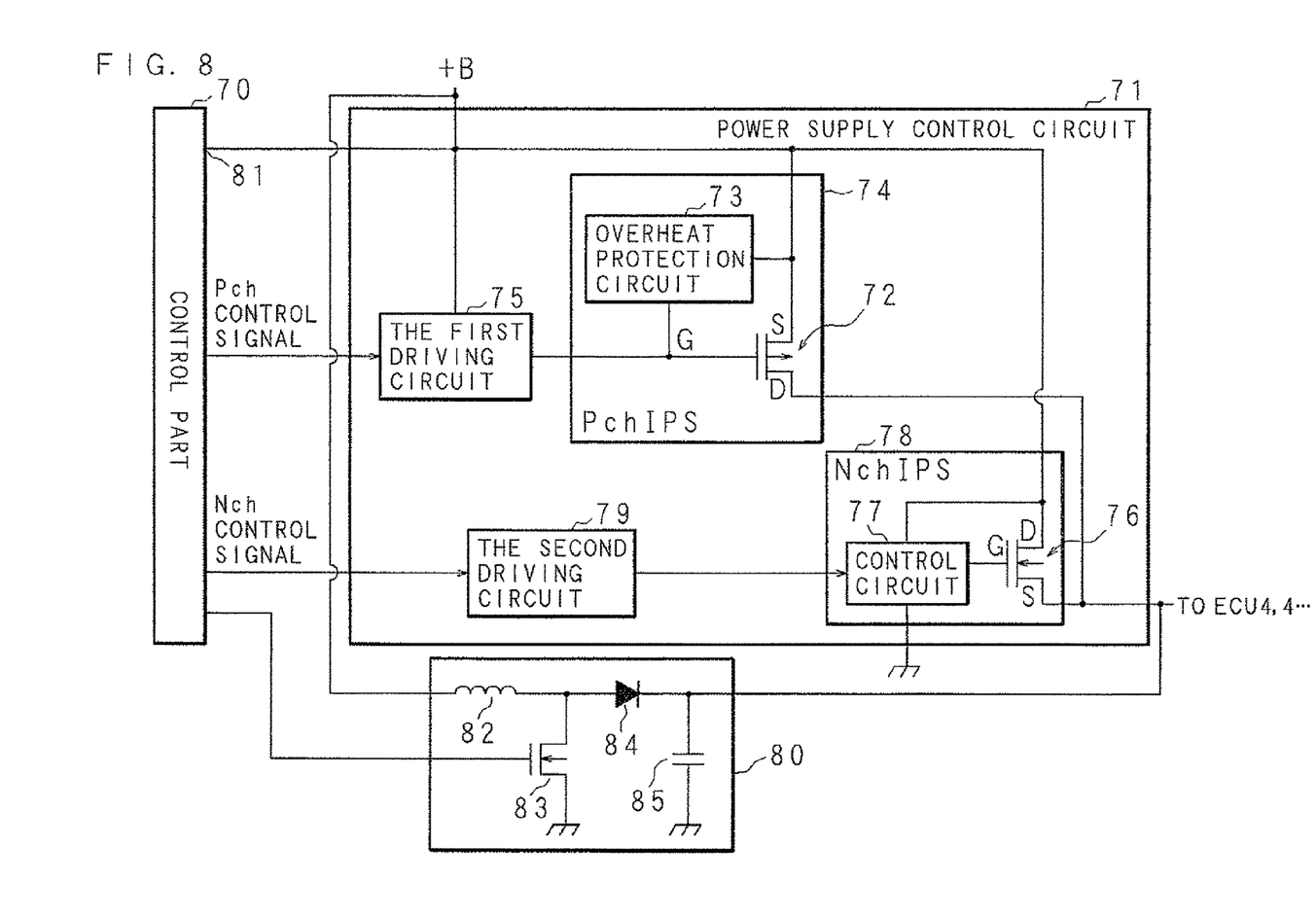
FIG. 8 is a circuit diagram illustrating an internal configuration of a power supply control circuit included in the power supply control device according to Embodiment 3.

FIG. 8 is a circuit diagram illustrating an internal configuration of the power supply control circuit 71 and the booster circuit 80 included in the power supply control device 7 according to Embodiment 3. The power supply control circuit 71 includes a P-channel IPS 74 using a P-channel FET 72 and containing an overheat protection circuit 73, the first driving circuit 75 driving the P-channel IPS 74 based on a control signal from the control part 70, an N-channel IPS 78 using an N-channel FET 76 and containing a control circuit 77 including the protective function, and the second driving circuit 79 driving the N-channel IPS 78 based on a control signal from the control part 70. Note that, in FIG. 8, "P-channel" and "N-channel" are represented as "Pch" and "Nth," respectively.

The source (S) of the P-channel FET 72 is connected to the positive voltage side (+B) of the battery 1, while the drain (D) thereof is connected to the side of the ECUs 4, 4, . . . (load). The gate (G) of the P-channel FET 72 is configured to receive an output of the first driving circuit 75.

The first driving circuit 75 is connected to the positive voltage side of the battery 1, and receives a P-channel (Pch) control signal from the control part 70 to control the gate voltage based on the P-channel control signal. The overheat protection circuit 73 is connected between the source and the gate of the P-channel FET 72, and is configured to forcibly turn off the P-channel FET 72 through a gate input upon sensing overheat.

The drain (D) of the N-channel FET 76 is connected to the positive voltage side (+B) of the battery 1, while the source (S) thereof is connected to the side of the ECUs 4, 4, . . . (load). The gate (G) of the N-channel FET 76 is configured to receive an output of the second driving circuit 79 through the control circuit 77 contained in the N-channel IPS 78.

One end of the control circuit 77 is connected to the drain of the N-channel FET 76, the other end thereof being connected (grounded) to the body earth of the vehicle, and includes a booster circuit for charge pumping the gate. The second driving circuit 79 receives an N-channel (Nch) control signal from the control part 70, and outputs a control signal to the control circuit 77 based on the N-channel control signal. When a signal for instructing to turn on is input from the control part 70 through the second driving circuit 79, the control circuit 77 raises the gate voltage to turn on the N-channel FET 76. In addition to the above, the control circuit 77 further includes a circuit for exerting the function of protection from overheat and overcurrent.

The booster circuit 80 is, for example, a boost chopper circuit here, in which one terminal of a coil 82 is connected to the positive voltage side (+B) of the battery 1 via a fuse 2 and the other terminal of the coil 82 is connected to the anode of a diode 84 and to the drain of an N-channel FET 83. The source of the N-channel FET 83 is grounded.

The cathode of the diode 84 is connected to one terminal of a smoothing capacitor 85 and to an output terminal of the power supply control circuit 71 connected to the ECUs 4, 4, . . . . The other terminal of the smoothing capacitor 85 is grounded.

The gate of the N-channel FET 83 is connected to the control part 70, which controls ON and OFF thereof.

When the booster circuit 80 is on, the gate of the N-channel FET 83 is controlled for its ON/OFF (chopped) by the control part 70. The booster circuit 80 thus raises the positive voltage of the battery 1 and outputs it to the ECUs 4, 4, . . . .

The P-channel IPS 74 (P-channel FET 72) and the N-channel IPS 78 (N-channel IPS 76) in the power supply control circuit 71 as well as the booster circuit 80 configured as described above are controlled by the control part 70 for their ON and OFF. The control part 70 controls to turn on one or both of the P-channel FET 72 and the N-channel IPS 76 depending on the state of the vehicle or the vehicle-mounted ECUs 4, 4, . . . , while controlling ON/OFF of the booster circuit 80 in accordance with the detection result of the voltage detector 81.

Since the P-channel IPS 74 and the N-channel IPS 78 of the power supply control circuit 71 respectively have protection circuits inside, operation of the protection circuits changes the states, which may cause the states of the P-channel IPS 74 and the N-channel IPS 78 to switch between ON and OFF.

Figure 9:
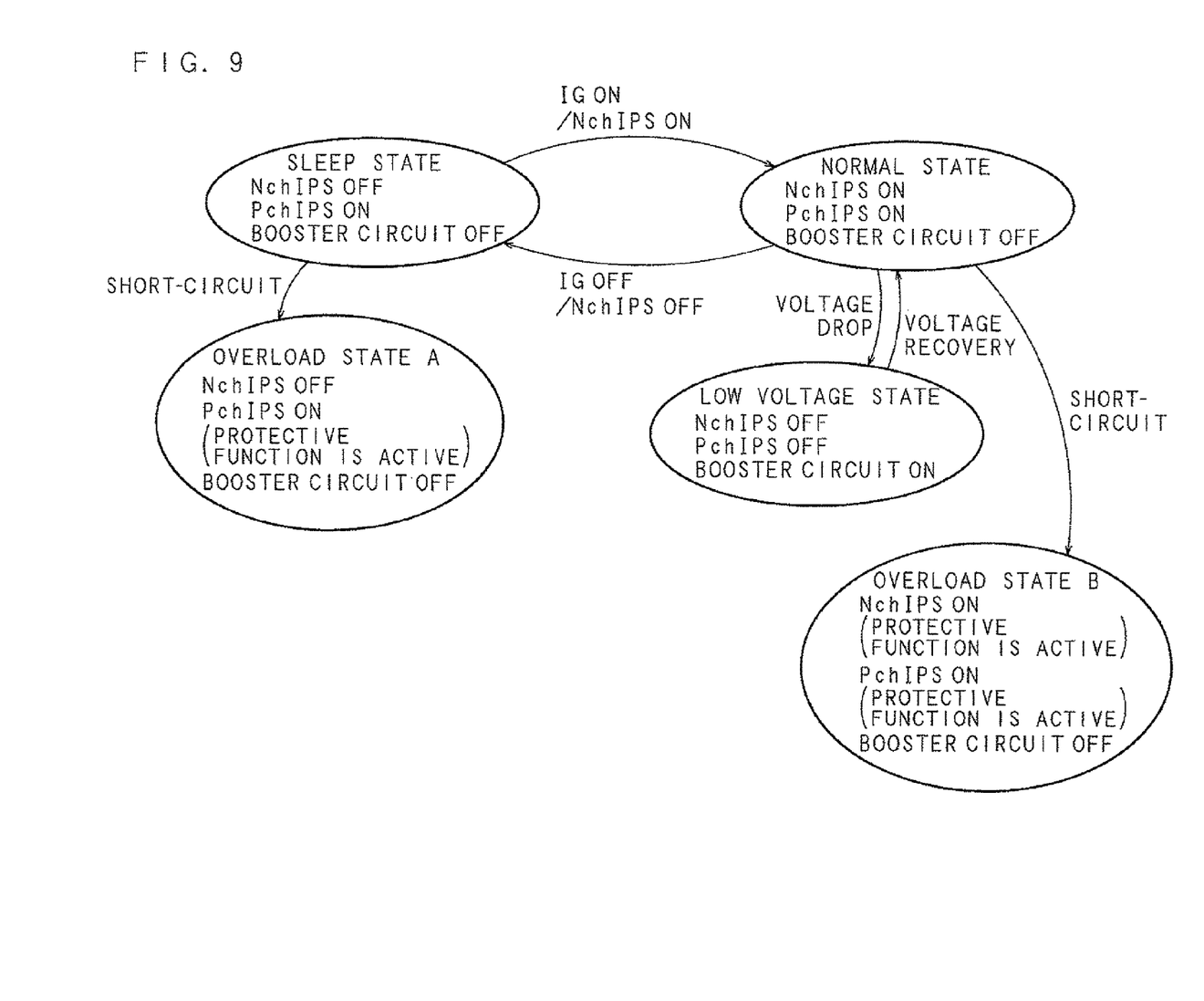
FIG. 9 is a state transition view illustrating an example of transition in states of control performed by the power supply control device according to Embodiment 3.

FIG. 9 is a state transition view illustrating an example of transition in states of control performed by the power supply control device 7 according to Embodiment 3. If the ignition switch is turned on (IG ON), the control part 70 senses it. The control part 70 determines that power feeding is necessary so as to switch the state to the normal state where the ECUs 4, 4, . . . operate. Here, the control part 70 outputs a P-channel control signal and an N-channel control signal for turning on (ON) both the P-channel IPS 74 and the N-channel IPS 78 to the first driving circuit 75 and the second driving circuit 79, while turning off the gate of the N-channel FET 83 and the booster circuit 80.

This turns on both the P-channel IPS 74 and the N-channel IPS 78, and power feeding to the ECUs 4, 4, . . . is started. The number and configuration of the ECUs 4, 4, . . . (load) are so designed that approximately six to nine amperes of current flows therethrough while the ECUs 4, 4, . . . are operating, when assumed that the standard for the fuse 2 is, for example, fifteen amperes. Here, assuming that six to nine amperes of current flows through the P-channel FET 72 and the N-channel FET 76 in a short period of time, devices used for the P-channel FET 72 and the N-channel FET 76 may appropriately be selected and designed.

In the normal state where all of the ECUs 4, 4, . . . operate, if the ignition switch is turned off (IG OFF) or if both the ignition switch and the accessory switch are turned off, the control part 70 senses this. Here, the control part 70 outputs an N-channel control signal to the second driving circuit 79 so as to turn off (OFF) the N-channel IPS 78 in response to transition of the ECUs 4, 4, . . . to the sleep state. Furthermore, the control part 70 turns off the booster circuit 80.

Accordingly, when the ECUs 4, 4, . . . make transition to the sleep state, the P-channel IPS 74 is turned on (ON) while the N-channel IPS 78 are turned off (OFF), thereby maintaining power feeding to the ECUs 4, 4, . . . at a certain degree. When the ECUs 4, 4, . . . made transition to the sleep state, the power feeding would be, for example, approximately several tens of milliamperes.

It is assumed here that the driving current for the N-channel IPS 78 is two to three milliamperes and the driving current for the P-channel IPS 74 is one hundred microamperes. In such a case, if the N-channel IPS 78 is turned on in the sleep state where the amount of current to the ECUs 4, 4, . . . may only be fifty milliamperes, the amount of current consumption of two to three milliamperes for the N-channel IPS 78 accounts for approximately five to ten percent of the whole amount of current. This is insufficient for effective power saving. Thus, only the P-channel IPS 74 which requires less driving current is turned on to effectively reduce power consumption.

Moreover, in the normal state where the ignition switch is turned on and at cranking when the engine starts, the output voltage (e.g., 12V) of the battery 1 may temporarily be at low voltage (5-6V) (low voltage state), since the starter consumes large amount of current. In such a case, if the input voltage value detected by the voltage detector 81 goes lower than a given voltage value, the control part 70 performs ON/OFF control (chopping) on the gate of the N-channel FET 83 to turn on (ON) the booster circuit 80 and also to turn off (OFF) the N-channel IPS 78 and the P-channel IPS 74. This raises the lowered output voltage of the battery 1, so that the current is output to the ECUs 4, 4, . . . without counterflowing at the N-channel IPS 78 and the P-channel IPS 74.

If the input voltage value detected by the voltage detector 81 goes higher than a given voltage value, the control part 70 turns on (ON) the N-channel IPS 78 and the P-channel IPS 74, and stops the ON/OFF control (chopping) on the gate of the N-channel FET 83 to turn off (OFF) the booster circuit 80. This allows the power supply control device 7 to make transition from the low voltage state to the normal state.

When short circuiting occurs at any one of the ECUs 4, 4, . . . when the ECUs 4, 4, . . . are in the sleep state, the protective function is activated at the P-channel IPS 74 which is on (overload state A). This can avoid destruction at the P-channel FET 72 due to overcurrent. In the overload state A, the control part 70 makes the booster circuit 80 be turned off.

Moreover, if short-circuit occurs at any one of the ECUs 4, 4, . . . when all of the ECUs 4, 4, . . . are in the normal state where they operate, the protective function is activated at both the P-channel IPS 74 and the N-channel IPS 78 (overload state B). This can avoid destruction at the P-channel FET 72 and the N-channel FET 76 due to overcurrent. In the overload state B, the control part 70 turns off the booster circuit 80.

It is desired to have a configuration in that the control part 70 causes the first driving circuit 75 or the second driving circuit 79 to feedback the transition so as to sense it, when it occurs, to the overload state A or B where the protection function is activated, generates warning sound to the driver through a speaker, and warns the driver about the occurrence of short-circuiting with a light.

If the ignition switch is turned on (IG ON) or if the accessory switch is turned on when the vehicle is halted and the ECUs 4, 4, . . . are in the sleep state, the control part 70 senses this. The control part 70 outputs an N-channel control signal to the second driving circuit 79 so as to turn on (ON) the N-channel IPS 78 in response to the fact that the ECUs 4, 4, . . . wakes up to be back in the normal state and start consuming current of six to nine amperes.

In Embodiment 3, the P-channel FET 72 and the N-channel FET 76 are connected in parallel with each other in the power supply control circuit 71, which is further connected in parallel to the booster circuit 80. This allows an FET appropriate for the status of the ECUs 4, 4, . . . to selectively operate while addressing reduction in voltage at cranking. It is thus possible to perform power supply control with high efficiency by making use of characteristics of low consumption current for the P-channel FET 72 in the sleep state and low on-resistance for the N-channel FET 76 in the active state. Furthermore, the P-channel FET 72 and the N-channel FET 76 are used in place of bypass relay for bypassing the booster circuit 80, thereby eliminating the relay noise and diminishing the restriction on an installation location.

In Embodiments 1 to 3, the power supply control circuit 31, 51 or 71 is connected to the positive voltage side (+B) of the battery 1. The present invention is, however, not limited thereto but may have a configuration in which the power supply control circuit 31, 51 or 71 is connected to the negative voltage side of the battery 1. It is highly possible that the components in the power supply control circuit here may have a relation of connection different from that of the power supply control circuits 31, 51 or 71 illustrated in Embodiments 1 to 3.

The example embodiments may be applicable to a power supply device including a direct current power supply and feeding power output by the direct current power supply to one or more loads.

The invention claimed is:

1. A power supply control circuit, comprising:
a power supply side terminal connected to a direct current power supply;

a load side terminal connected to a load that is activated by power from the direct current power supply;
a first FET (Field Effect Transistor) of a P type;
a second FET of an N type;
a first driving circuit for the first FET;
a second driving circuit for the second FET; and
a potential difference detection circuit, comprising:
    a detection part for detecting a potential difference between a drain and a source of the first FET or a drain and a source of the second FET; and
    a voltage comparison part for comparing the detected potential difference and a given voltage value,
wherein the first FET and the second FET are connected in parallel with each other between the power supply side terminal and the load side terminal, and
the potential difference detection circuit outputs a signal to the second driving circuit so as to turn on the second FET if the potential difference is equal to or higher than the given voltage value as a result of a comparison performed by the voltage comparison part.

2. The power supply control circuit according to claim 1, further comprising
a protection circuit for protection from overheat, overvoltage or overcurrent, wherein
the protection circuit is connected to the first FET or to both the first FET and the second FET.

3. The power supply control circuit according to claim 1, further comprising:
a temperature detection circuit, comprising:
    a detection part for detecting temperature at and around the first FET; and
    a temperature comparison part for comparing the detected temperature and a given temperature,
wherein the temperature detection circuit outputs a signal to the second driving circuit so as to turn on the second FET if the temperature is equal to or higher than the given temperature as a result of a comparison performed by the temperature comparison part.

4. The power supply control circuit according to claim 3, further comprising
a latch circuit connected to the temperature detection circuit, wherein
the latch circuit outputs a signal received from the temperature detection circuit to the second driving circuit.

5. The power supply control circuit according to claim 3, wherein
the temperature detection circuit outputs a signal to the second driving circuit so as to turn off the second FET if the temperature is lower by predetermined temperature than the given temperature as a result of a comparison performed by the temperature comparison part.

6. The power supply control circuit according to claim 1, wherein
the first FET is configured to feed power to the load when only the first FET is on.

7. The power supply control circuit according to claim 1, further comprising
a latch circuit connected to the potential difference detection circuit, wherein
the latch circuit outputs a signal received from the potential difference detection circuit to the second driving circuit.

8. The power supply control circuit according to claim 1, wherein
the potential difference detection circuit outputs a signal to the second driving circuit so as to turn off the second FET if the potential difference is lower by a predetermined value than the given voltage value.

9. The power supply control circuit according to claim 1, wherein
the source of the first FET and the drain of the second FET are connected to the power supply side terminal, and
the drain of the first FET and the source of the second FET are connected to the load side terminal.

10. The power supply control circuit according to claim 9, further comprising
a second FET control circuit for controlling ON and OFF of the second FET, wherein
the second FET control circuit is connected to a gate and the drain of the second FET and to a fixed potential, and includes a booster circuit for the gate of the second FET.

11. The power supply control circuit according to claim 1, wherein
the power supply side terminal is connected to a positive voltage side of the direct current power supply.

12. A power supply control device, comprising:
a control part for controlling operation of a load; and
a power supply control circuit for controlling power feeding from a direct current power supply to the load, the power supply control circuit comprising:
    a power supply side terminal connected to the direct current power supply;
    a load side terminal connected to the load;
    a first FET of a P type;
    a second FET of an N type;
    a first driving circuit for the first FET;
    a second driving circuit for the second FET; and
    a potential difference detection circuit, comprising:
        a detection part for detecting a potential difference between a drain and a source of the first FET or a drain and a source of the second FET; and
        a voltage comparison part for comparing the detected potential difference and a given voltage value,
    wherein the first FET and the second FET are connected in parallel with each other between the power supply side terminal and the load side terminal,
    the potential difference detection circuit outputs a signal to the second driving circuit so as to turn on the second FET if the potential difference is equal to or higher than the given voltage value as a result of comparison performed by the voltage comparison part, and
the control part outputs a control signal for instructing ON or OFF to the driving circuits in accordance with an operation state of the load.

13. The power supply control device according to claim 12, wherein
the load operates in a plurality of states with different power consumption including a sleep state and an active state, and
the control part outputs a control signal for turning on the first and second FETs if the load is in the active state, and outputs a control signal for turning off the second FET if the load is in the sleep state.

14. The power supply control device according to claim 13, wherein
the control part is configured to receive a signal indicating the operation state of the load, and outputs the control signal based on the signal.

15. The power supply control device according to claim 13, further comprising
a communication part for receiving state information from the load, wherein
the control part outputs the control signal based on the state information received by the communication part.

16. The power supply control device according to claim 12, further comprising
 a booster circuit connected in parallel to the power supply control circuit, the booster circuit comprising:
  a power supply side terminal connected to the direct current power supply;
  a load side terminal connected to the load; and
  a circuit for raising a voltage value of the direct current power supply input at the power supply side terminal and outputting the raised voltage value to the load side terminal,
 wherein the control part further comprises a detection part for detecting a voltage value supplied from the direct current power supply to the power supply side terminal, and
 the control part outputs a control signal for controlling ON or OFF of the booster circuit based on the voltage value detected by the detection part.

17. The power supply control device according to claim 16, wherein
 the control part outputs a control signal for turning on the booster circuit if the voltage value detected by the detection part is less than a given voltage value.

18. The power supply control device according to claim 12, wherein
 the source of the first FET and the drain of the second FET of the power supply control circuit are connected to the direct current power supply, and
 the drain of the first FET and the source of the second FET of the power supply control circuit are connected to the load.

19. The power supply control device according to claim 12, wherein
 the power supply side terminal is connected to a positive voltage side of the direct current power supply.

* * * * *